United States Patent [19]

Napp

[11] 3,726,391

[45] Apr. 10, 1973

[54] PORTABLE RING STORAGE AND FEEDING UNIT

[75] Inventor: Sidney M., Napp, Rockton, Ill.

[73] Assignee: The Bendix Corporation, Southfield, Mich.

[22] Filed: Apr. 28, 1970

[21] Appl. No.: 32,669

[52] U.S. Cl. ................................................. 198/212
[51] Int. Cl. .............................................. B65g 33/00
[58] Field of Search .................. 193/12; 198/79, 136, 198/171, 212; 160/323, 343; 211/70, 78

[56] References Cited

UNITED STATES PATENTS

| 2,628,708 | 2/1953 | Wahl et al. ............................ 198/212 |
| 3,261,453 | 7/1966 | Hirs ....................................... 198/212 |
| 288,231 | 11/1883 | Grimmett et al. ..................... 160/343 |

FOREIGN PATENTS OR APPLICATIONS 478,859  1/1916  France .................................. 160/343

Primary Examiner—Evon C. Blunk
Assistant Examiner—Johnny D. Cherry
Attorney—John R. Benefiel and Plante, Hartz, Smith and Thompson

[57] ABSTRACT

A portable storage and feeding device for rings or similar articles having openings therethrough comprising a helical rack member and means for feeding the rings or articles onto the helical rack member by passing the coils through the openings of the rings and including means for advancing the rings on and off of the rack member. A first embodiment utilizes wiper members partially supporting the rack member for advancing the rings on and off the helical rack member, while a second embodiment utilizes a gravity feed and discharge arrangement.

12 Claims, 9 Drawing Figures

INVENTOR.
Sidney M. Napp,
BY John R. Benefiel
ATTORNEY.

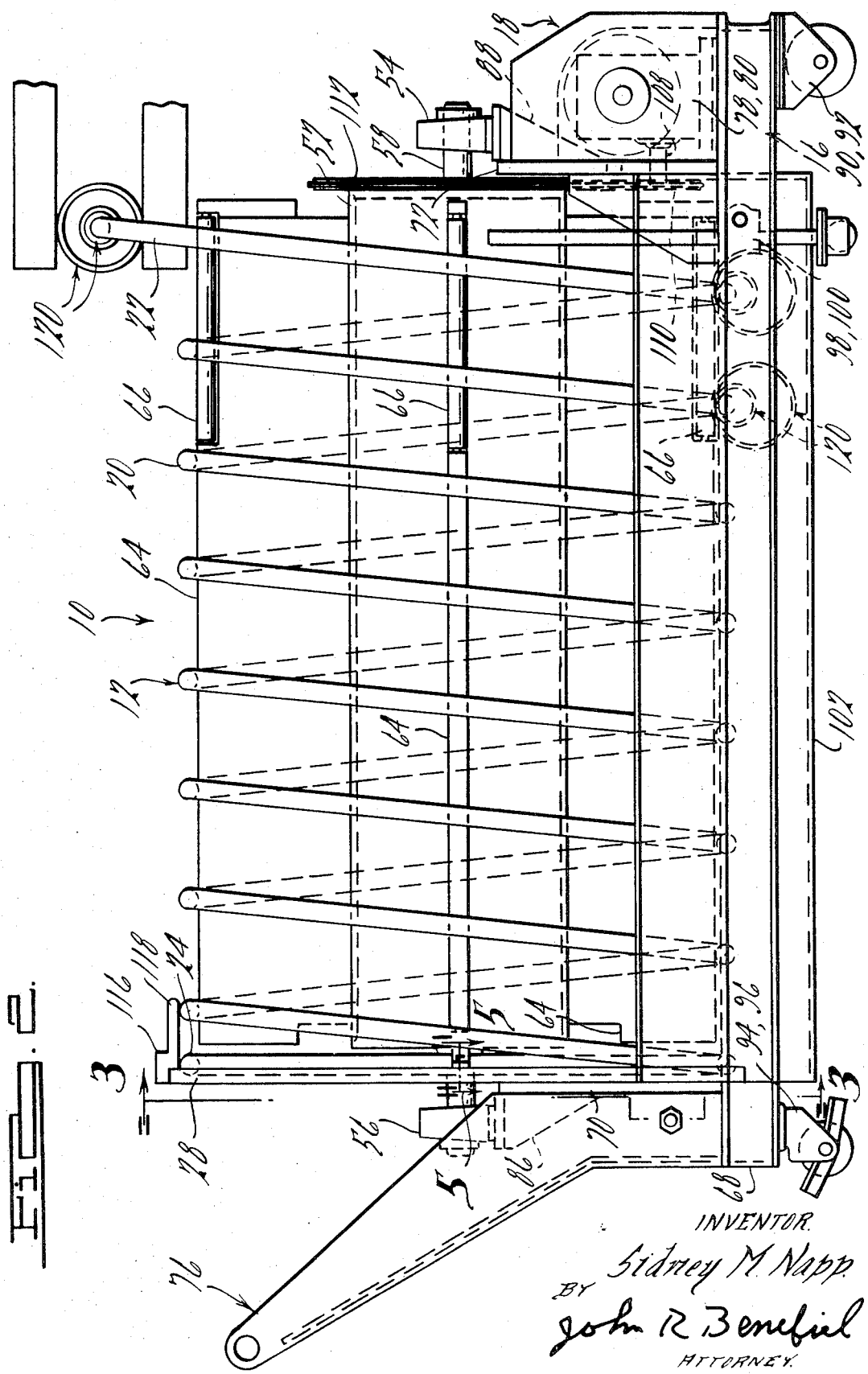

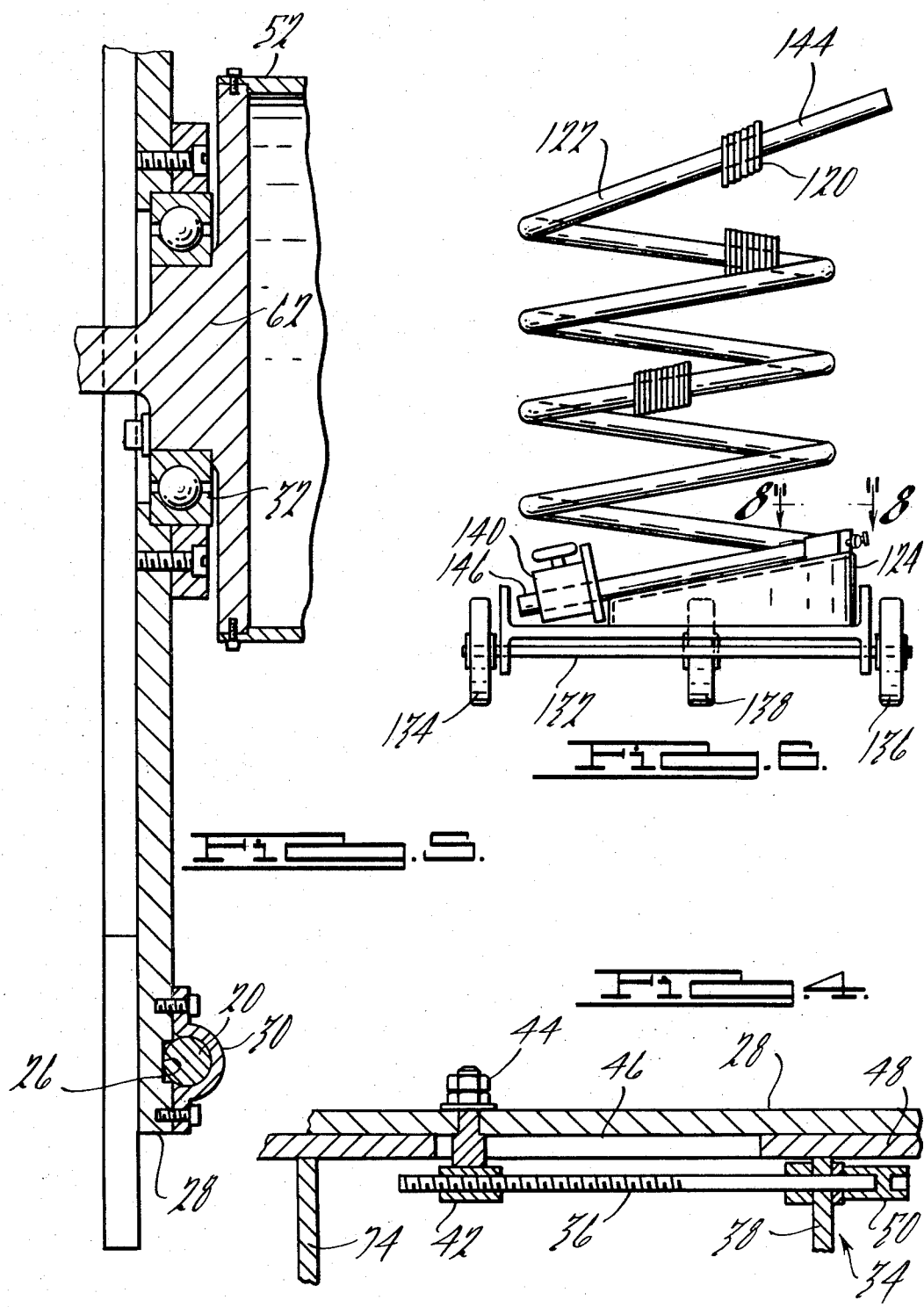

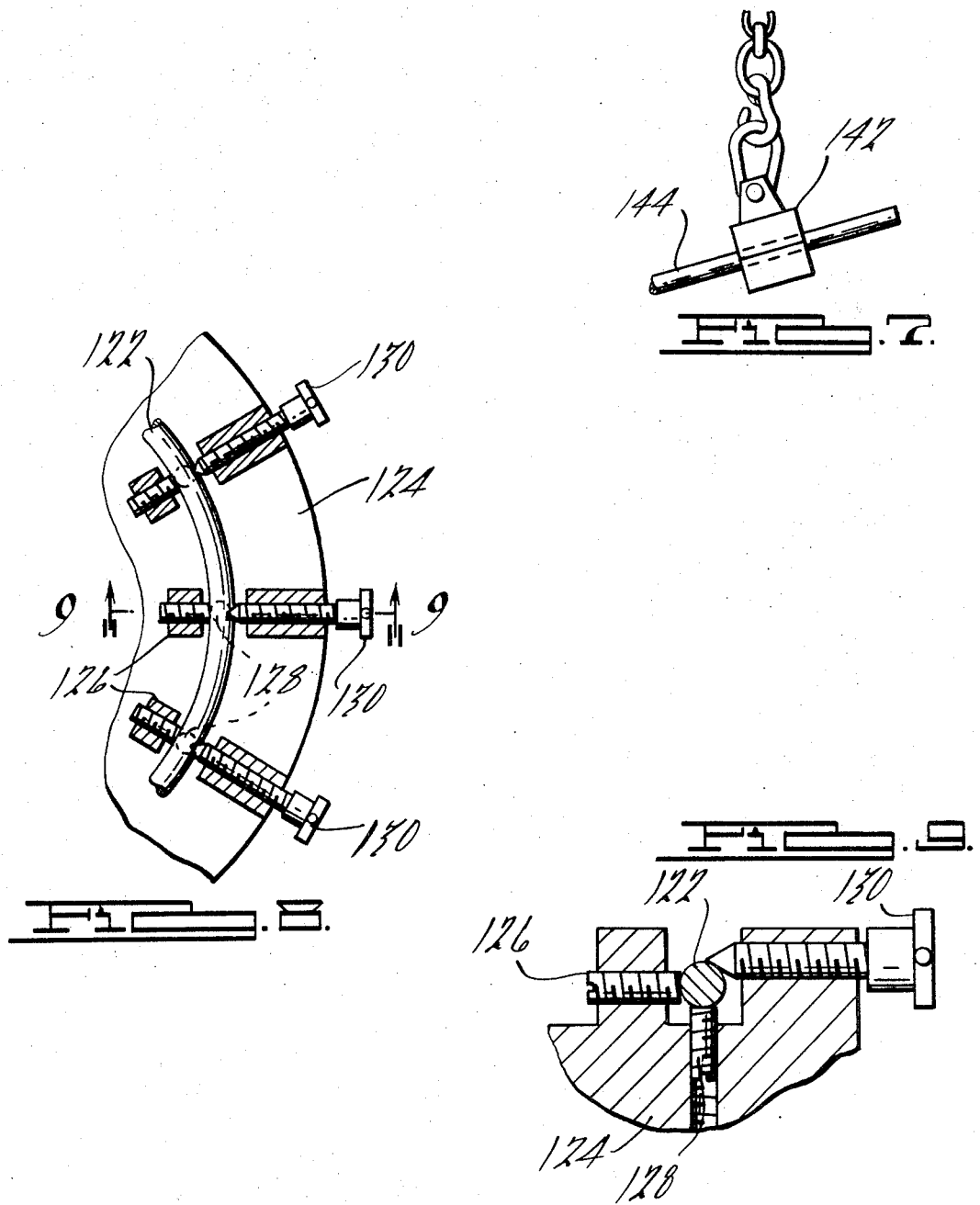

PORTABLE RING STORAGE AND FEEDING UNIT

BACKGROUND OF THE INVENTION

Piston ring manufacturing involves the problem of handling and storing piston rings before and between operations. Normally, it requires three and four or sometimes five passes through a grinder in order to produce semi-finished ground rings. Other preparations on the rings are then performed such as gapping, grooving, chamfering, chrome plating, etc. Invariably, the rings must be finished disc ground, which requires an additional one or two passes.

The equipment and methods of handling between operations is rather crude and has not changed in many years.

Similar problems are involved in other manufacturing operations in which large numbers of small articles having central openings therethrough must be handled in great numbers repeatedly.

Prior art storage units, as for example the units disclosed in U.S. Pat. Nos. 3,261,453 and 3,071,240 have taken advantage of the inherent space savings characteristic of a helical rack and combined it with wipers to advance parts along the helical rack. However, these units have arrangements for placing the articles within a channel formed in the helical rack, which arrangement is not suitable for piston rings as there are severe limitations as to adaptability of differing sizes of articles, the disposition of articles does not, in the case of ringed articles, make most efficient use of the available storage space, and also the rack must be vertically oriented since gravity is utilized to retain the articles in the channel. In addition, these units are fixed and do not provide for relative portability for convenient removal to a storage area.

Therefore, it is an object of the present invention to provide a portable storage rack in which a large number of rings or similar articles are capable of being stored in a small volume of space.

It is another object of this invention to provide such a storage unit which is capable of handling rings or other articles of widely varying sizes and configurations.

It is a further object of the present invention to provide a storage rack which may be disposed in either the horizontal or vertical directions and does not necessarily depend on gravity for retention of the articles on the rack.

SUMMARY OF THE INVENTION

These objects and other objects which will become apparent upon a reading of the following specification and claims are accomplished by providing a helical rack member together with means for feeding the rings or other articles onto the helical rack through the openings therethrough and advancing these rings along said rack either onto or off of the helical rack member, as required. A power driven wiper structure is provided in one embodiment while a gravity feed arrangement is provided in a second embodiment, with both of these being mounted for ready portability so as to allow them to be moved to a storage area until needed.

DESCRIPTION OF THE DRAWINGS

FIG. 2 is a side elevational view of the power driven embodiment shown in FIG. 1.

FIG. 4 is a view of the section taken along the lines 4—4 in FIG. 3.

FIG. 5 is a view of the section taken along the lines 5—5 in FIG. 2.

FIG. 6 is a front elevation of the gravity feed embodiment of the invention.

FIG. 7 is a front elevational view of a segment of the coiled rack shown in FIG. 6 showing the installation of the lifting eye.

FIG. 8 is a partial view of the gravity feed embodiment in the direction of the lines 8—8 in FIG. 6.

FIG. 9 is a view of the section taken along the lines 9-9 in FIG. 8.

DETAILED DESCRIPTION

In the following detailed description certain specific terminology will be employed and particular embodiments described for the sake of clarity and in order to provide a full and complete understanding of the invention, but it is to be understood that the invention is not so limited and may be practiced in a variety of forms and embodiments.

Figure 1:
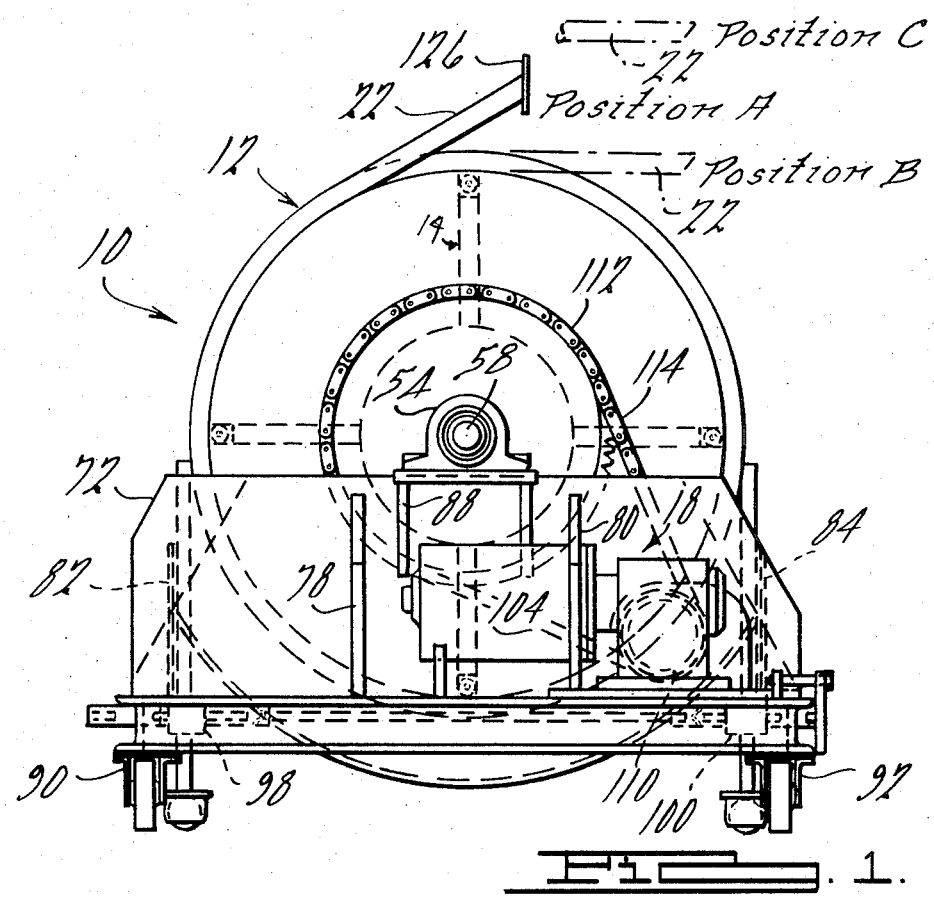
FIG. 1 is an end view of the power driven embodiment of the invention.

Referring to the drawings and particularly FIGS. 1 and 2, the power driven storage device 10 is indicated. This unit includes a coil assembly 12 disposed in surrounding relationship to a wiper assembly 14 with both supported on a frame 16, the wiper assembly 14 being driven by a drive mechanism 18.

The coil assembly 12 includes the coil rack member 20 having at one end a coil segment 22 extending tangentially from the periphery of the coil. The opposite end of the coil rack member 20 is disposed with the last loop 24 partially within a groove 26 (FIG. 5) formed in a retainer plate 28 and secured therein by means of clamps 30 disposed at intervals along groove 26, which also serves to anchor the coil rack member 20 against relative rotative movement.

Retainer plate 28 is supported rotatively by the bearing 32 (FIG. 5) and is normally positioned against rotative movement by means of an adjustment mechanism 34 (FIG. 3 and 4) which includes the threaded rod 36 laterally positioned with respect to plate 38 and pinned to retainer plate 28 at 40 by means of the threaded member 42 connected to a pin 44 which passes through a slot 46 through the end plate 48 provided in order to obtain the necessary clearance. Rotation of the rod 36 by means of socket 50 secured thereto, allows the retainer plate 28 and attached coil rack member 20 to be adjustably positioned about the axis of the bearing 32.

Figure 3:
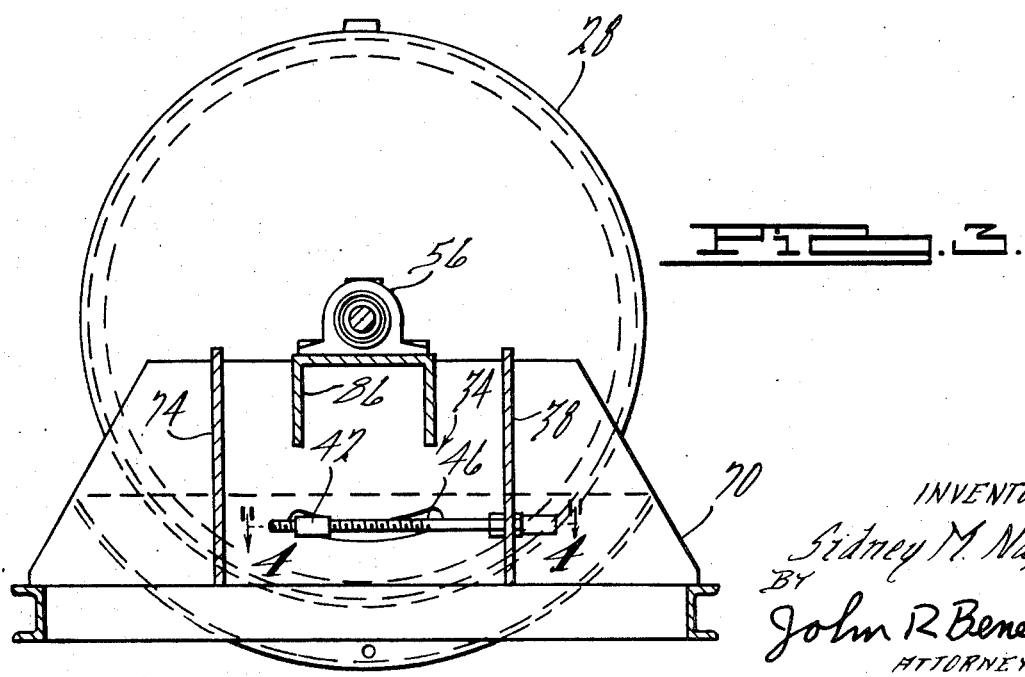
FIG. 3 is a view of the section taken along a line 3—3 in FIG. 2.

The position of the coil rack member 20 in the brackets 30 is initially selected so that in the position shown in FIGS. 3 and 4, the end segment of the coil rack member 20 is the position "A" (FIG. 1) and through continued rotation of rod 36, the end segment 22 may be positioned in position "B" (FIG. 1). Approximately 30° adjustment is allowed by the arrangements shown in these figures.

The wiper assembly 14 includes a cylindrical drum 52, which is rotatively supported in bearings 54, 56, by means of extending axles 58 and 60, integral therewith.

The bearing assembly 32, providing support for end plate 28 is rotatively supported on a step portion 62 of the left-hand end of drum 52. A plurality of wiper blades 64 are secured to the drum 52, each including a roller element 66 in positive engagement with the coil rack member 20 to provide end support without excessive friction for the coil rack member 20.

Support for these assemblies is provided by the frame 16 which includes a frame member 68, consisting of a group of channel iron pieces welded together, and provided with end plates 70, 72. End plate 70 is braced by plates 38, 74 shown extending outwardly to provide a handle 76 for moving the unit. The end plate 72 is braced by means of gussets 78, 80, 82 and 84. The bearings 54, 56 are supported on the end plates 72 and 70 by means of brackets 86, 88.

Frame 68 is supported by fixed casters 90, 92 and movable casters 94, 96 which may be equipped with foot brakes so that the unit may be moved readily and render the device portable. In addition, the connected jacks 98, 100 are provided in order to selectively raise the free end of the unit in order to position segment 22 in position "C" shown in FIG. 1.

A drip pan 102 is also supplied to collect oil draining from the rings.

Drive mechanism 18 is provided to drive the wiper assembly 14 at a variable angular rate. This includes a reversible D.C. motor 104 and variable speed drive 106, the output 108 of which is drivingly connected to the drum 52 by means of sprocket 110 secured to the output 108, sprocket 112 secured to the drum 52 with an interconnecting roller chain 114.

A limit switch 116 is provided with leafs 118 designed to engage advancing rings and discontinue the wiper drive 18 and/or any feed machinery from which the rings are being accepted.

In operation, the coil segment 22 is adjusted to position "A" (FIG. 1) and disposed at the acceptance point so as to intercept the rings 120 as they exit from the grinding machine or other apparatus. The wiper motor and variable speed drive 104, 106 are activated with the wiper speed adjusted to correspond with the feed rate of the rings 120. The rings will then be accepted onto the segment 22 where they will slide by gravity until engaging the wiper blades which will advance them down the length of the coil rack member 20 until the first ring engages the leafs 118 at which point the coil will be filled to capacity and the feed will be discontinued.

In order to discharge the stored rings, the segment 22 is positioned in position "B" with the end portion disposed at the point of delivery of the rings. The drive assembly 18 is then activated and adjusted to deliver the rings at the rate desired.

Manipulation of the jacks 98, 100 to raise the unit may be done if required as in grinding machines, to facilitate discharge, with the motor 104 then reversed to feed the rings off the coil rack member 20.

From this description, it can be seen that a great number of rings may be stored on the coil rack member 20 since they are positioned parallel to each other on the coil rack 20. In addition, a wide variety of ring sizes can be received since the coil rack 20 and the wiper assembly 14 will operate to receive rings of greatly varying diameter. Thus, manual handling of the rings may be eliminated with expeditious handling of the rings provided.

In FIGS. 6–9, a gravity feed embodiment is illustrated. In this unit, a coil rack 122 is secured to a mounting platform 124 by means of a clamping arrangement shown in FIGS. 8 and 9. Set screws 126 and 128 and clamp screw 130 serve to clamp the lower end of the coil rack 122 to the platform 124, which is in turn secured to base 132 supported on casters 134, 136, 138 so as to render this embodiment portable to provide for convenient movement to and from storage areas. A stop block 140 is provided clamped to the extreme lower end of the coil rack 122. A detachable eye bolt 142 (FIG. 7) is also provided which may be secured to the coil rack 122 on segment 144.

In use, the end segment 144 is positioned at an acceptance point so as to receive the rings 120, which descend onto the coil rack 122 under the influence of gravity which may be assisted by means of an air vibrator (not shown) or other such means. When the coil rack is full, mounting platform 124 is released by manipulation of the clamps 130, with the eye bolt 142 then being secured to the segment 144. The operator then raises the loaded coil rack 122 by means of a hoist and positions the lower segment 146 at the delivery point such as the receiving point of the grinding machine, thereafter allowing feed from the coil rack 122 by removal of the stop block 140. This may also be facilitated by use of an air vibrator (not shown).

From the above description, it can be appreciated that a simple, compact storage and feeding unit has been provided which allows expeditious and efficient handling of piston rings and articles of a similar nature.

What is claimed is:

1. A storage unit for articles having openings therethrough comprising:
   a helically coiled rack member;
   means for feeding said articles onto said rack through said openings; and
   means for advancing said articles along said rack member, including wiper means rotatable about the axis of and relative to said rack member, said wiper means including at least one wiper member disposed to engage articles on said rack member and said rack member;
   means providing substantial support for said rack member by said wiper member engagement therewith; and
   also including means for rotating said wiper member relative to said rack member about said axis, whereby said articles may be advanced by said at least one wiper member along said rack member without interference from external supports.

2. The unit of claim 1 wherein said rack member has a segment at one end extending tangentially from said helix and further including means for selectively positioning said rack member at variable rotational positions about said axis, whereby said segment is disposed in selectively variable positions.

3. The unit of claim 1 wherein said rack member is disposed with the helix axis disposed substantially horizontally.

4. The unit of claim 3 wherein the wiper means is disposed within said rack member and wherein said at least one wiper member has a portion engaging the inside of said rack member at one end.

5. The unit of claim 4 wherein said means providing substantial support for said rack member includes means for rotatably supporting said at least one wiper member whereby support for said rack member one end is provided by said wiper member.

6. The unit of claim 5 wherein said portion is a roller element.

7. The unit of claim 3 wherein said wiper means includes a plurality of angularly spaced wiper members disposed to engage said articles and said rack member.

8. The unit of claim 7 wherein said wiper means each include a portion engaging said rack member at one end, and wherein said means providing substantial support for said rack member includes means for rotatably supporting said wiper members, whereby support for said rack member is provided.

9. The unit of claim 8 further including a support member secured to the other end of said rack member and further including means for fixing said support member against angular movement about said axis relative to said wiper means.

10. The unit of claim 9 further including means for selectively shifting the fixed relative position of said wiper means and said support plate.

11. The unit of claim 3 further including means for selectively raising one end of said rack member.

12. The unit of claim 1 wherein said at least one wiper member positively engages said rack member to provide said substantial support for said rack member.

* * * * *